United States Patent [19]

Gabas

[11] Patent Number: 4,988,180
[45] Date of Patent: Jan. 29, 1991

[54] SAFETY MIRROR ASSEMBLY FOR AUTOMOBILE SUN VISORS

[75] Inventor: Carlos Gabas, Barcelona, Spain

[73] Assignee: Industrias Techno-Matic, S.A., Barcelona, Spain

[21] Appl. No.: 529,905

[22] Filed: May 29, 1990

[30] Foreign Application Priority Data

Jun. 5, 1989 [ES] Spain ............................. 8901954

[51] Int. Cl.$^5$ ............................................. G02B 5/08
[52] U.S. Cl. ................................. 350/641; 350/631
[58] Field of Search ............................. 350/631, 641

[56] References Cited

U.S. PATENT DOCUMENTS

| | | | |
|---|---|---|---|
| 3,843,236 | 10/1974 | Kutz, Jr. | 350/641 |
| 4,605,292 | 8/1986 | McIntosh | 350/600 |
| 4,666,264 | 5/1987 | Yamabe | 350/641 |

FOREIGN PATENT DOCUMENTS 088846  9/1983  European Pat. Off. .

OTHER PUBLICATIONS

Mirror en Aluminium "Almir".

Primary Examiner—Bruce Y. Arnold
Assistant Examiner—J. P. Ryan
Attorney, Agent, or Firm—Michael J. Striker

[57] ABSTRACT

A safety mirror assembly for automobile sun visors which comprises a conventional glass mirror with an adhesive layer or tape on its reflective surface side, and an integral transparent cover having an essentially rectangular shape and made as one piece from a plastic material for housing the glass mirror. The integral transparent cover has a continuous frame that meets the current safety standards, and is provided with lateral guides having support flanges and positioning stops to allow insertion and securing of the glass mirror inside the integral transparent cover.

3 Claims, 1 Drawing Sheet

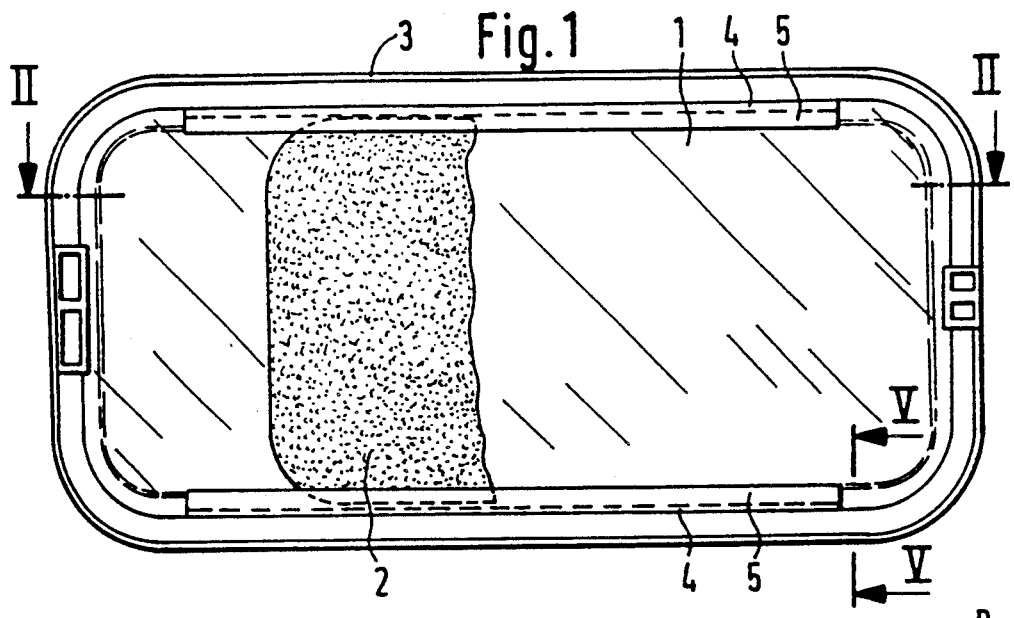
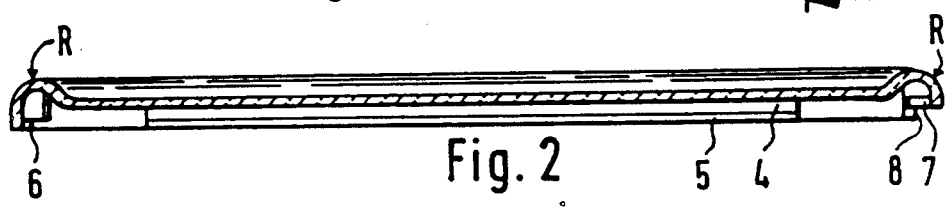
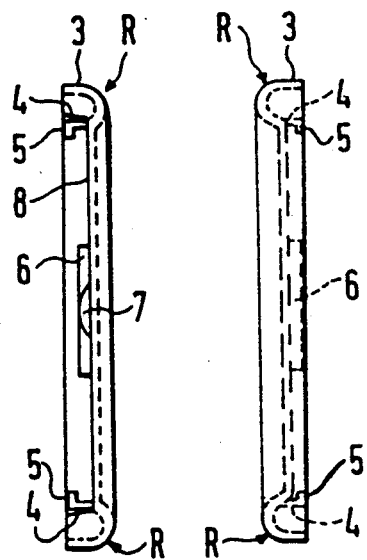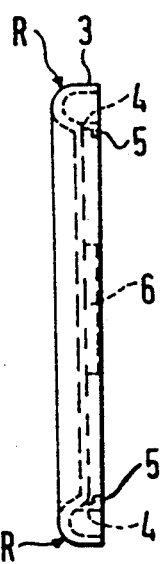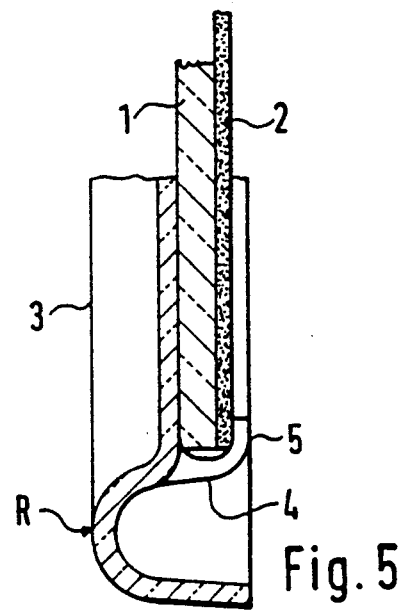

SAFETY MIRROR ASSEMBLY FOR AUTOMOBILE SUN VISORS

BACKGROUND OF THE INVENTION

1. Field of the Invention

The subject of this invention is a safety mirror assembly for automobile sun visors and in particular one that is attachable to the sun visor on the passenger side.

2. Description of the Prior Art

The constant advancement of safety conditions inside automobiles is one of the priorities of car makers and of present legislation. As an example, it is recommended to use non-splinter window glass and to eliminate all sharp edges. The minimum curve radii need be not less than 3.2 mm. This is because in the event of a crash or accident, the glass and other objects, can cause the occupants of the vehicle serious injuries. These safety requirements apply to all objects, finishes, and equipment located inside the vehicle, including the so-called "courtesy mirror" which is normally incorporated in the sun visor on the passenger side.

Up to now, the safety measures adopted for preventing any damage that might be caused by the courtesy mirror, traditionally made of glass, in the event of a crash, have consisted essentially of coating the reflective surface side of the mirror with an adhesive layer or tape for retaining, in case of mirror break, large and medium-sized fragments of glass. However, in practice, the tape is not able to retain all small-sized fragments, and in cases of accident, a number of small-sized glass splinters fall out, with a corresponding risk of serious injuries to the occupants of the vehicle, especially if the fragments come into contact with particularly delicate areas, such as the eyes of a vehicle occupant.

Patent No. EP 0088846 describes a courtesy mirror which consists of a shaped sheet of plastic material with a metallized coating on one side used as the reflecting element. French patent No. 8813077 describes a courtesy mirror made from a shaped sheet of aluminum, one of the sides of which has basically been polished and anodized for use as the reflecting element.

Both of the above-mentioned patents, Nos. EP 0088846 and FR 8813077, refer, respectively, to new plastic or aluminum mirrors that replace the traditional glass type mirrors. These new mirrors, nonetheless, have a serious drawback which is their inferior quality of image compared to that obtained with traditional glass mirrors.

SUMMARY OF THE INVENTION

The object of the invention is a safety mirror assembly for automobile sun visors comprising a glass mirror but which at the same time permits to avoid injuries which might have been caused to vehicle passengers by the mirror getting smashed in case of an accident. The object of the invention is achieved by providing a safety mirror assembly for automobile sun visors comprising a traditional glass mirror with an adhesive layer or tape on the reflective surface side, and an integral transparent cover, essentially rectangular in shape, or any other shape adapted to each specific application, made as one piece from a plastic material and which houses the glass mirror. This transparent integral cover has a continuous frame which cross-section complies with current safety standards, and means for fitting and securing the mirror inside the cover.

In the safety mirror assembly according to the invention, the functions of each of its component parts are completely differentiated. The traditional glass mirror gives a high quality image, superior to that obtained from using reflective materials on plastic or metal supports, as described in prior art, and the transparent integral cover prevents both the projection of bits of glass from the mirror, if the mirror breaks during a car crash, and any injuries that might be suffered by an occupant of the vehicle as a result of the occupant himself causing the mirror to break during collision of the vehicle.

The protection, provided for the vehicle's occupants in the event of a crash, by the transparent integral cover of the safety mirror assembly according to the invention and described above, is further reinforced by the fact that the glass mirror has an adhesive layer or tape on its reflective surface side which, to a large extent, prevents the bits of mirror from falling out in case of breakage. Thus, the transparent integral cover and the adhesive layer or tape on the mirror are separate safety factors which complement each other, thereby providing the subject of this invention with an optimum level of safety.

In the safety mirror assembly for automobile sun visors according to the invention the means of inserting and securing the mirror inside the transparent integral cover comprises lateral guides fitted with support flanges which extend almost along the entire length of the transparent integral cover, and positioning stops fixed normally to the lateral guides.

Both components of the safety mirror assembly according to the invention, the glass mirror and the transparent integral cover, are of such dimensions that they match up with each other, so the glass mirror with the aforementioned adhesive layer or tape may be slide close-fittingly along the lateral guides with support flanges on the transparent integral cover until the point where the combined action of the positioning stops holds it securely and without any change of it shifting, in its position of use.

After the mirror is fitted in the transparent integral cover of the safety mirror assembly according to the invention, the assembly may in turn, without any difficulty at all, be attached to conventional automobile sun visors.

The present invention both as to its construction so to its method of operation, together with additional objects and advantages thereof, will be best understood from the following detailed description of preferred embodiment when read with reference to the accompanying drawings.

BRIEF DESCRIPTION OF THE DRAWINGS

FIG. 1 is a partially cross-sectional view of a safety mirror assembly of the invention;

FIG. 2 is a longitudinal cross-sectional view along line II—II of the safety mirror assembly shown in FIG. 1;

FIGS. 3 and 4 are side views of the safety mirror assembly of the invention; and FIG. 5 is a cross-sectional view of the safety mirror assembly of the invention, taken along line V—V in FIG. 1.

DETAILED DESCRIPTION OF THE PREFERRED EMBODIMENT

The safety mirror assembly for automobile sun visors which is the subject of the present invention, and is described herein, comprises a glass mirror 1 with an adhesive layer or tape 2, and an integral cover 3 made of highly transparent plastic material and large enough to house the glass mirror 1 with the adhesive layer or tape 2.

The transparent integral cover 3 is essentially rectangular in shape, as shown in FIG. 1, which shape is most commonly used for the courtesy mirrors located on the sun visor of the passenger side. However, other possible variations in shape of the transparent integral cover 3 can be used. For example, the shape may be square, circular, etc., depending on the needs of each particular application.

This transparent integral cover 3 has a continuous frame with rounded corners and which is shown in detail in FIG. 5. The radius R of the cover complies with current safety standards concerning the elimination of sharp edges inside the vehicle.

In this embodiment, the transparent integral cover 3 has, on both its long sides, lateral guides 4 fitted with continuous support flanges 5, the lateral guides 4 and support flanges 5 extending almost along the entire length of the integral cover 3, as shown in FIGS. 1 and 2.

The distance between the facing sides of both lateral guides 4, which are parallel to each other, and the distance between the inner sides of the U-shaped wing that acts as retaining means and is formed by each of the support flanges 5, do, of course, correspond respectively to the width and thickness of the glass mirror 1 with adhesive layer or tape 2, so that the mirror may be slid along, close-fittingly, during its insertion into the transparent integral cover 3, as shown in FIGS. 1 and 5 of the attached sheet of drawings.

The transparent integral cover 3 also carries a front positioning stop 6 and a rear positioning stop 7. The front stop determines the foremost position that the glass mirror 1 with adhesive layer or tape 2 can reach during its insertion into the transparent integral cover 3, while the latter stop fixes the glass mirror 1 with adhesive layer or tape 2 securely in position inside the transparent integral cover 3.

In order to facilitate insertion of the glass mirror 1 with adhesive layer or tape 2 into the transparent integral cover 3 where it remains fixed, a notch 8 is provided in one of the shorter sides of the transparent integral cover 3 as shown in FIGS. 2 and 3.

Once the glass mirror 1 with adhesive layer or tape 2 is housed inside the transparent integral cover 3, forming a single functional unit, the safety mirror assembly may easily be mounted into the automobile sun visors.

While the invention has been illustrated and described as embodied in a safety mirror assembly for automobile sun visors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A safety mirror assembly for automobile sun visors, comprising a conventional glass mirror having one of an adhesive layer and tape on the reflective surface side; and a transparent integral cover having a predetermined shape, said transparent integral cover being made as one piece from a plastic material and having dimensions big enough to accommodate said glass mirror, said transparent integral cover having a continuous frame that has no sharp edges and means for fitting and securing the glass mirror inside said transparent integral cover.

2. A safety mirror assembly for automobile sun visors according to claim 1, wherein said means for fitting and securing the glass mirror inside the transparent integral cover comprises lateral guides fitted with support flanges extending along the entire length of said transparent integral cover, and front and rear positioning stops fitted normally to said lateral guides.

3. A safety mirror assembly for automobile sun visors according to claim 1, wherein said transparent cover has one of rectangular, square and circular shapes.

* * * * *